3,043,845
PHENYLMETHYLPIPERIDINE DERIVATIVES
Harold E. Zaugg, Lake Forest, and Robert W. De Net, Waukegan, Ill., assignors to Abbott Laboratories, Chicago, Ill., a corporation of Illinois
No Drawing. Filed Dec. 29, 1958, Ser. No. 783,150
4 Claims. (Cl. 260—294.7)

This invention relates to novel phenylpiperidine derivatives represented by the following formula:

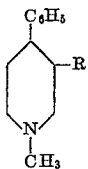

where R is benzoyl and α-hydroxy-α-methylbenzyl. The novel compounds are prepared by reacting a phenyl Grignard reagent with the alkaloid arecoline to obtain the ketone 1-methyl-3-benzoyl-4-phenylpiperidine. The carbinol 1-methyl-3-(α-hydroxy-α-methylbenzyl)-4-phenylpiperidine is obtained from the ketone by reacting said ketone with a methyl Grignard reagent.

The compounds of this invention occur in the cis and trans isomeric forms and these isomeric forms are intended to be included within the scope of this invention. The cis-form of the compound where R is benzoyl is converted to the trans-form by heating said compound with an acid, and the trans-ketone is directly obtained by treating the trans-benzoyl form with a methyl Grignard reagent. The compounds of this invention possess activity as potentiators of central nervous system depressants and also possess activity as anti-parkinson agents.

The following examples are presented to set out the preparation of said compounds, but are not intended to represent an exclusive embodiment thereof.

EXAMPLE I

Cis-1-Methyl-3-Benzoyl-4-Phenylpiperidine

To a stirred solution of approximately 43 g. (0.24 mole) of phenylmagnesium bromide in 300 ml. of dry ether is added in several portions, 15 g. (0.06 mole) of powdered arecoline hydrobromide. The mixture is stirred and refluxed for two hours and allowed to stand overnight. To the stirred reaction mixture cooled in ice is added dropwise an aqueous solution of ammonium chloride. The ether layer is then separated and extracted with dilute hydrochloric acid. The acid extract is cooled in ice and made alkaline by the addition of a 40% aqueous potassium hydroxide solution. The precipitated oil is taken up in ether and dried over anhydrous magnesium sulfate. Filtration and removal of the ether by distillation gives 6 g. (36%) of pure cis-1-methyl-3-benzoyl-4-phenylpiperidine, M.P. 115–116°.

Analysis.—Calcd. for $C_{19}H_{21}NO$: C, 81.68%; H, 7.57%; N, 5.01%; O, 5.74%. Found: C, 81.52%; H, 7.34%; N, 5.07%; O, 5.61%.

EXAMPLE II

1-Methyl-3-Benzoyl-4-Phenylpiperidine Methiodide

The cis-1-methyl-3-benzoyl-4-phenylpiperidine methiodide is prepared by treatment of a sample of cis-1-methyl-3-benzoyl-4-phenylpiperidine with excess methyl iodide in methyl ethyl ketone, M.P. 217–218° dec.

Analysis.—Calcd. for $C_{20}H_{24}INO$: C, 57.01%; H, 5.74%; N, 3.32%. Found: C, 57.18%; H, 6.04%; N, 3.30%.

EXAMPLE III

Trans-1-Methyl-3-Benzoyl-4-Phenylpiperidine

A mixture of 10 g. of cis-1-methyl-3-benzoyl-4-phenylpiperidine compound and 60 ml. of 48% aqueous hydrobromic acid is refluxed gently overnight and then poured into cold water. The mixture is made alkaline by the careful addition of excess solid sodium carbonate and the resulting oil is taken up in ether and dried over anhydrous magnesium sulfate. Filtration and removal of the ether by distillation gives an oil which solidifies on trituration with hexane (Skellysolve B). Two recrystallizations from hexane give 7.2 g. (72%) of trans-1-methyl-3-benzoyl-4-phenylpiperidine compound, M.P. 62–63°.

Analysis.—Calcd. for $C_{19}H_{21}NO$: C, 81.68%; H, 7.57%; N, 5.01%; O, 5.74%. Found: C, 81.27%; H, 7.70%; N, 4.83%; O, 5.77%.

EXAMPLE IV

The hydrochloride salt of the base of Example III is prepared by adding the base of Example III to alcoholic hydrogen chloride in ether, M.P. 230–231° dec.

Analysis.—Calcd. for $C_{19}H_{22}ClNO$: C, 72.25%; H, 7.02%; N, 4.44%. Found: C, 72.17%; H, 7.13%; N, 4.40%.

EXAMPLE V

Cis-1-Methyl-3-(α-Hydroxy-α-Methylbenzyl)-4-Phenylpiperidine

To a stirred solution of methylmagnesium iodide prepared from 5.7 g. (0.04 mole) of methyl iodide and 1 g. (0.04 mole) of magnesium in 50 ml. of dry ether is added rapidly to a solution of 7 g. (0.025 mole) of the cis-ketone, cis-1-methyl-3-benzoyl-4-phenylpiperidine, in 50 ml. of dry benzene. After refluxing for 2 hours, the reaction mixture is treated with aqueous ammonium chloride and worked up according to the procedure outlined in Example I. The crude product is recrystallized once from hexane (Skellysolve B) to give 5.3 g. (72%) of the cis-carbinol, cis - 1 - methyl-(α-hydroxy-α-methylbenzyl)-4-phenylpiperidine, M.P. 83–84°. Recrystallization of the sample raises the M.P. to 86–87°.

Analysis.—Calcd. for $C_{20}H_{25}NO$: C, 81.31%; H, 8.53%; N, 4.74%. Found: C, 81.30%; H, 8.59%; N, 4.81%.

EXAMPLE VI

Trans-1-Methyl-(α-Hydroxy-α-Methylbenzyl)-4-Phenylpiperidine

In like manner to Example V, treatment of trans-1-methyl-3-benzoyl-4-phenylpiperidine with methylmagnesium iodide results in an 84% yield of the trans-carbinol, trans-1-methyl-(α-hydroxy-α-methylbenzyl) - 4 - phenylpiperidine, M.P. 142–143° (from cyclohexane).

Analysis.—Calcd. for $C_{20}H_{25}NO$: C, 81.31%; H, 8.53%; N, 4.74%. Found: C, 81.28%; H, 8.54%; N, 4.59%.

The phenyl and methyl Grignard reagents employed in the foregoing examples are not restricted to the halide forms specifically named. It will be apparent to those skilled in the art that other operable halide Grignard reagents are operable in the process.

Others may practice the invention in any of the numerous ways which will be suggested by this disclosure to one skilled in the art. All such practice of the invention is considered to be a part hereof provided it falls within the scope of the appended claims.

We claim:
1. Cis-1-methyl-3-benzoyl-4-phenylpiperidine.
2. Trans-1-methyl-3-benzoyl-4-phenylpiperidine.
3. Cis-1-methyl - (α-hydroxy-α-methylbenzyl)-4-phenylpiperidine.

4. Trans-1-methyl-(α-hydroxy-α-methylbenzyl)-4-phenylpiperidine.

References Cited in the file of this patent

UNITED STATES PATENTS

| | | |
|---|---|---|
| 2,624,739 | Werner | Jan. 6, 1953 |
| 2,683,145 | Lyle et al. | July 6, 1954 |
| 2,739,968 | Sperber et al. | Mar. 27, 1956 |
| 2,807,585 | Gardner et al. | Sept. 24, 1957 |
| 2,894,949 | Tilford et al. | July 14, 1959 |

OTHER REFERENCES

Plati et al.: Jour. Org. Chem., vol. 15, pages 1165–1171 (1950).